United States Patent
Soeda et al.

(10) Patent No.: US 10,520,385 B2
(45) Date of Patent: Dec. 31, 2019

(54) VACUUM GAUGE STATE DETECTION METHOD AND SYSTEM

(71) Applicant: Azbil Corporation, Chiyoda-ku (JP)

(72) Inventors: Masaru Soeda, Chiyoda-ku (JP);
Takuya Ishihara, Chiyoda-ku (JP);
Masashi Sekine, Chiyoda-ku (JP);
Hidenobu Tochigi, Chiyoda-ku (JP)

(73) Assignee: Azbil Corporation, Chiyoda-ku (JP)

( * ) Notice: Subject to any disclaimer, the term of this patent is extended or adjusted under 35 U.S.C. 154(b) by 257 days.

(21) Appl. No.: 15/491,150

(22) Filed: Apr. 19, 2017

(65) Prior Publication Data
US 2017/0299458 A1    Oct. 19, 2017

(30) Foreign Application Priority Data
Apr. 19, 2016    (JP) ................ 2016-083458

(51) Int. Cl.
*G01L 21/00*        (2006.01)
*G01L 9/00*         (2006.01)

(52) U.S. Cl.
CPC ............ *G01L 21/00* (2013.01); *G01L 9/0073* (2013.01)

(58) Field of Classification Search
CPC ..... G01L 27/00; G01L 27/007; G01L 19/147; G01L 19/0054; G01L 9/0042; F02D 41/222; A61B 5/02156; F02M 25/0809; B64D 2700/62166
USPC ........................................ 73/1.57, 1.58, 754
See application file for complete search history.

(56) References Cited

U.S. PATENT DOCUMENTS

| | | | | |
|---|---|---|---|---|
| 5,793,297 | A  * | 8/1998 | Takeuchi ................. | G01D 3/08 |
| | | | | 324/500 |
| 8,770,035 | B2 * | 7/2014 | Yamada ................ | G01L 9/0042 |
| | | | | 257/415 |
| 9,224,252 | B1 * | 12/2015 | Guo ....................... | G07C 5/0808 |
| 2002/0067255 | A1 * | 6/2002 | Tanizawa ................ | G01L 9/045 |
| | | | | 340/514 |

(Continued)

FOREIGN PATENT DOCUMENTS

| | | |
|---|---|---|
| CN | 101720427 A | 6/2010 |
| JP | 2010-525324 | 7/2010 |

OTHER PUBLICATIONS

Combined Chinese Office action and Search Report dated Feb. 12, 2019 in corresponding Chinese Patent Application No. 201710255945.1 (with English Translation), 16 pages.

(Continued)

*Primary Examiner* — John Fitzgerald
*Assistant Examiner* — Truong D Phan
(74) *Attorney, Agent, or Firm* — Oblon, McClelland, Maier & Neustadt, L.L.P.

(57) ABSTRACT

A state determination unit compares an output value obtained by a measuring unit with a reference characteristic value that serves as a reference, counts the number of times an excessive pressure application state occurs in which the output value is determined to be equal to or larger than the reference characteristic value, and determines whether the number of times reaches an upper limit that is set. An alarm output unit outputs an alarm when the state determination unit determines that the number of times the output value is equal to or larger than the reference characteristic value reaches the set upper limit.

8 Claims, 5 Drawing Sheets

(56) References Cited

U.S. PATENT DOCUMENTS

| | | | |
|---|---|---|---|
| 2007/0068266 A1* | 3/2007 | Fujimori | B60C 23/0408 |
| | | | 73/724 |
| 2008/0255787 A1 | 10/2008 | Sullivan et al. | |
| 2012/0118068 A1* | 5/2012 | Yamada | G01L 9/0042 |
| | | | 73/754 |
| 2017/0038719 A1* | 2/2017 | Takemura | G03G 15/5062 |

OTHER PUBLICATIONS

Masashi Sekine, et al. "Development of the Sensor Chip and Package for a High-Temperature Sapphire Capacitance Diaphragm Gauge", Azbil Technical Review, pp. 28 to 33, Jan. 2011.

\* cited by examiner

VACUUM GAUGE STATE DETECTION METHOD AND SYSTEM

CROSS-REFERENCE TO RELATED APPLICATIONS

The present application is based on and claims priority to Japanese Application No. 2016-083458, filed Apr. 19, 2016, the entire contents of which are incorporated therein by reference.

BACKGROUND OF THE INVENTION

1. Field of the Invention

The present invention relates to a vacuum gauge state detection method and a vacuum gauge state detection system for detecting the state of a capacitance vacuum gauge including a movable portion, such as a diaphragm, which senses pressure.

2. Description of the Related Art

In a capacitance diaphragm gauge, a diaphragm, which is a movable portion, senses pressure, and a deflection of the diaphragm caused by pressure is converted to a capacitance value. Such a diaphragm gauge has a small dependence on gas type, and therefore, is commonly used in industrial applications, such as facilities for manufacturing semiconductor devices (see Masashi Sekine, Takuya Ishihara, Nobuo Sashinami, Takeo Tani "Development of the Sensor Chip and Package for a High-Temperature Sapphire Capacitance Diaphragm Gauge", Azbil Technical Review, pp. 28 to 33, Issue January 2011).

The diaphragm gauge described above includes a base 301, a diaphragm 302, and a pneumatic chamber 303, as illustrated in FIG. 6. The base 301 is formed of an insulator. The diaphragm 302 is formed of an insulator. The diaphragm 302 is supported by a support 301a of the base 301, spaced apart from the base 301 in a movable region 302a of the diaphragm 302, and displaceable in the movable region 302a toward the base 301. The diaphragm 302 senses pressure from a measurement target. The pneumatic chamber 303 is formed between the movable region 302a of the diaphragm 302 and the base 301. Each portion is formed of sapphire.

The diaphragm gauge further includes a movable electrode 304 formed in the movable region 302a of the diaphragm 302, and a fixed electrode 305 formed on the base 301 so as to face the movable electrode 304. The diaphragm gauge further includes a movable reference electrode 306 formed in the movable region 302a of the diaphragm 302 around the movable electrode 304, and a fixed reference electrode 307 formed on the base 301 around the fixed electrode 305 so as to face the movable reference electrode 306.

The diaphragm gauge formed as described above is attached to a pipe, for example, through which a measurement-target gas flows to measure pressure. In the capacitance diaphragm gauge, a deflection of the diaphragm subjected to pressure is converted to a capacitance value. The capacitance diaphragm gauge has a small dependence on the type of gas used, and therefore, is widely used in industrial applications, such as facilities for manufacturing semiconductor devices as described above.

A diaphragm gauge that is used for a film deposition apparatus or an etching apparatus used in manufacture of semiconductor devices is required to have resistance to corrosion caused by a material gas or a cleaning gas, resistance to a by-product deposited during a process, and thermal resistance to a heated pipe. The diaphragm gauge is further required to have durability at the time of maintenance.

A film deposition apparatus or an etching apparatus has a vacuum chamber that is exposed to the atmosphere at the time of maintenance. At this time, an excessive pressure higher than the atmospheric pressure is applied to the diaphragm gauge. Because of stress relaxation, for example, of the diaphragm that is subjected to pressure, the zero-point output value of the diaphragm gauge often changes (hereinafter referred to as "zero-point shift"). Such a change in the output value is caused not only by the stress relaxation but may be caused also by a change in the state of a film deposited on the diaphragm as a by-product produced during a process.

As a measure against the zero-point shift, an adjustment is made commonly by electrically resetting the zero point of the diaphragm gauge. Such an adjustment is currently made on the basis of the user's judgment about the necessity for an adjustment. However, in a case where such an adjustment operation is beyond an allowable adjustment range, the operation is no longer possible and the diaphragm gauge needs to be replaced, which requires the apparatus of interest to be unexpectedly stopped for replacement. Further, it is difficult for the user to predict a frequency and timing at which a zero-point adjustment needs to be made.

As a measure against application of an excessive pressure, a valve may be provided between the diaphragm gauge and the vacuum chamber, and the valve may be closed at the time of maintenance in which an excessive pressure is applied so as to prevent the atmospheric pressure from being applied to the diaphragm gauge. However, this measure is not desirable in terms of both a fail-safe aspect and costs for valve installation.

The allowance of the zero-point shift is specified in advance in the specifications of the diaphragm gauge, and therefore, it is necessary to detect a sign of deterioration caused by application of an excessive pressure or deposition of a by-product. If such a sign is detectable, planned preventive maintenance can be performed, and maintenance need not be frequently performed, which contributes to a reduction in the facility maintenance costs.

In order to detect deterioration (zero-point shift) of a diaphragm gauge, a configuration is currently employed in which an amount of bias adjustment at the time of a zero-point adjustment is monitored, and alarm information is issued from a measurement circuit if the total amount of bias adjustment exceeds a certain threshold. Then, replacement or maintenance of the diaphragm gauge is performed commonly on the basis of the user's judgment about the necessity for replacement or maintenance by referring to a level indicated by the alarm information or an offset amount of the output value of the diaphragm gauge at the time of return to the zero point. Determination as to whether the diaphragm gauge has been appropriately maintained is left to the user's judgment, and therefore, an adjustment may be beyond the allowable adjustment range for the zero point, and the diaphragm gauge may become non-usable.

As the technique for automatically adjusting the zero point of a diaphragm gauge, a technique is available in which the time when inspection or replacement needs to be performed is predicted on the basis of information about the time when a zero-point adjustment was made to thereby automatically perform calibration (see Japanese Unexamined Patent Application Publication (Translation of PCT Application) No. 2010-525324). The information based on which prediction is made is collected at the time when the user makes a zero-point adjustment, and may vary depending on the frequency of zero-point adjustment, that is, depending on the user's action and judgement. Further, in a case where the frequency of use of the facility of interest changes or in a case where different process conditions coexist, the precision of prediction of the time may decrease. The time when a zero-point adjustment was made needs to be checked, and therefore, even if subsequent calibration can be automatically performed, a manual operation still needs to be performed by the user.

SUMMARY OF THE INVENTION

The present invention has been made to address the issues described above and enables more precise determination of the time when maintenance of a vacuum gauge is to be performed.

A vacuum gauge state detection method according to an aspect of the present invention is a vacuum gauge state detection method for detecting a state of a diaphragm of a vacuum gauge, the vacuum gauge being constituted by a sensor chip including the diaphragm that is displaceable and that senses pressure from a measurement target, and detecting a deflection of the diaphragm as a capacitance change, the method including: a first step of obtaining an output value of the vacuum gauge; a second step of comparing the output value obtained in the first step with a reference characteristic value that serves as a reference; a third step of counting the number of times an excessive pressure application state occurs in which the output value is determined to be equal to or larger than the reference characteristic value on the basis of the comparing in the second step; and a fourth step of determining whether the number of times obtained in the third step reaches an upper limit that is set.

In the vacuum gauge state detection method described above, time information about a time when the excessive pressure application state is determined to occur on the basis of the comparing in the second step may be obtained, a date and time when a zero-point adjustment for the vacuum gauge is no longer possible may be predicted on the basis of the obtained time information, the number of times obtained in the third step, and the set upper limit, and the upper limit may be determined on the basis of a threshold date and time obtained by subtracting days and hours taken to perform maintenance of the vacuum gauge from the predicted date and time.

In the vacuum gauge state detection method described above, a rate may be obtained by dividing an amount of adjustment made to the vacuum gauge in a last zero-point adjustment by the number of times obtained in the third step, a remaining number of times may be determined on the basis of a value obtained by dividing an allowable amount of adjustment of the vacuum gauge at a current time point by the rate, and a value obtained by adding the remaining number of times to the number of times may be set as the upper limit.

A vacuum gauge state detection system according to an aspect of the present invention is a vacuum gauge state detection system including: a vacuum gauge that is constituted by a sensor chip including a diaphragm that is displaceable and that senses pressure from a measurement target, and detects a deflection of the diaphragm as a capacitance change; a measuring unit that obtains an output value of the vacuum gauge; and a state determination unit that compares the output value obtained by the measuring unit with a reference characteristic value that serves as a reference, counts the number of times an excessive pressure application state occurs in which the output value is determined to be equal to or larger than the reference characteristic value, and determines whether the number of times reaches an upper limit that is set.

In the vacuum gauge state detection system described above, the state determination unit may obtain time information about a time when the excessive pressure application state is determined to occur on the basis of the comparison, predict a date and time when a zero-point adjustment for the vacuum gauge is no longer possible on the basis of the obtained time information, the number of times, and the set upper limit, and determine the upper limit on the basis of a threshold date and time obtained by subtracting days and hours taken to perform maintenance of the vacuum gauge from the predicted date and time.

In the vacuum gauge state detection system described above, the state determination unit may obtain a rate by dividing an amount of adjustment made to the vacuum gauge in a last zero-point adjustment by the number of times, determine a remaining number of times on the basis of a value obtained by dividing an allowable amount of adjustment of the vacuum gauge at a current time point by the rate, and set a value obtained by adding the remaining number of times to the number of times as the upper limit.

As described above, according to aspects of the present invention, it is determined whether the number of times the excessive pressure application state in which the output value of the vacuum gauge is equal to or larger than the reference characteristic value occurs reaches the upper limit. Accordingly, the time when maintenance of the vacuum gauge is to be performed can be determined more precisely, which is an advantageous effect.

DESCRIPTION OF THE PREFERRED EMBODIMENTS

First Embodiment

Figure 1:
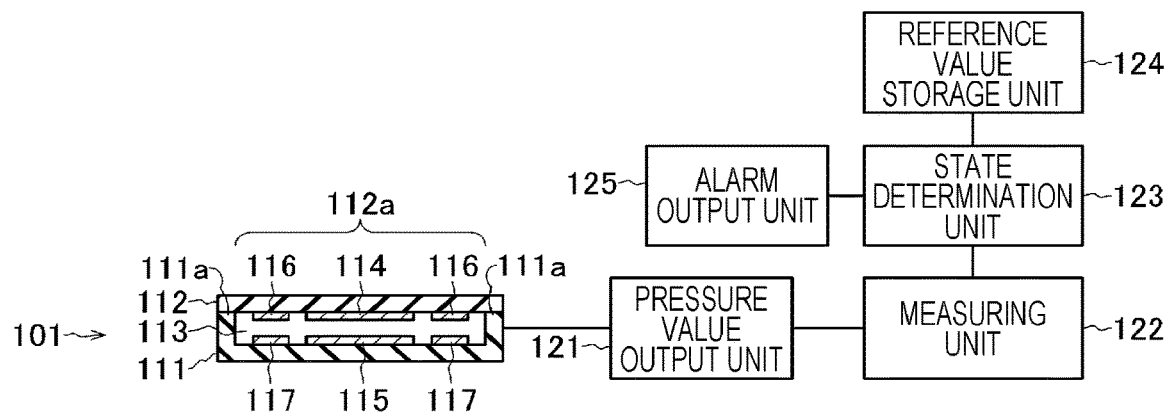
FIG. 1 is a block diagram illustrating a configuration of a vacuum gauge state detection system according to a first embodiment of the present invention.

Hereinafter, embodiments of the present invention will be described with reference to the drawings. FIG. 1 is a block diagram illustrating a configuration of a vacuum gauge state detection system according to a first embodiment of the present invention. This system includes a sensor chip 101, a pressure value output unit 121, a measuring unit 122, a state determination unit 123, a reference value storage unit 124, and an alarm output unit 125.

The sensor chip 101 is a typical capacitance diaphragm gauge and includes a base 111, a diaphragm 112, a movable electrode 114, and a fixed electrode 115. The base 111 and the diaphragm 112 are formed of a heat- and corrosion-resistant insulator, such as sapphire or alumina ceramics. The diaphragm 112, which is a pressure sensor, is a movable portion that is supported by a support 111a of the base 111 and is displaceable toward the base 111 in a movable region 112a located inside relative to the support 111a. The movable region 112a has a circle shape in plan view, for example.

A space between the movable region 112a of the diaphragm 112 and the base 111 is defined as a pneumatic chamber 113, which is hermetically sealed. The pneumatic chamber 113 is in a vacuum and serves as a reference vacuum chamber.

The movable electrode 114 is formed inside the pneumatic chamber 113 in the movable region 112a of the diaphragm 112. The fixed electrode 115 is formed inside the pneumatic chamber 113 on the base 111 so as to face the movable electrode 114. The sensor chip 101 further includes a movable reference electrode 116, which is formed inside the pneumatic chamber 113 in the movable region 112a of the diaphragm 112 around the movable electrode 114, and a fixed reference electrode 117, which is formed inside the pneumatic chamber 113 on the base 111 around the fixed electrode 115 so as to face the movable reference electrode 116.

The pressure value output unit 121 converts a capacitance change to a pressure value on the basis of a set sensor sensitivity and outputs the pressure value. The sensor chip 101 and the pressure value output unit 121 constitute a vacuum gauge. The measuring unit 122, the state determination unit 123, the reference value storage unit 124, and the alarm output unit 125 are combined with the vacuum gauge to enable measurement and control, for example, of the degree of vacuum (pressure) in an apparatus, such as a film deposition apparatus or an etching apparatus.

The measuring unit 122 obtains an output value of the vacuum gauge (pressure value output unit 121). The state determination unit 123 compares the output value obtained by the measuring unit 122 with a reference characteristic value that serves as the reference, counts the number of times an excessive pressure application state occurs in which the output value is determined to be equal to or larger than the reference characteristic value, and determines whether the number of times reaches an upper limit that is set. The reference characteristic value is stored in the reference value storage unit 124. The measuring unit 122 and the state determination unit 123 are implemented by processing circuitry, e.g., a CPU executing program instructions that cause the CPU to perform the functionality described herein. Alternatively, the measuring unit 122 is implemented as a separate circuit from the state determination unit 123. Further, the reference value storage unit 124 can be any non-transitory memory.

The alarm output unit 125 outputs an alarm when the state determination unit 123 determines that the number of times the output value is equal to or larger than the reference characteristic value reaches the set upper limit. When the alarm is output, the user can know that the vacuum gauge is in a state where maintenance is required.

Figure 2:
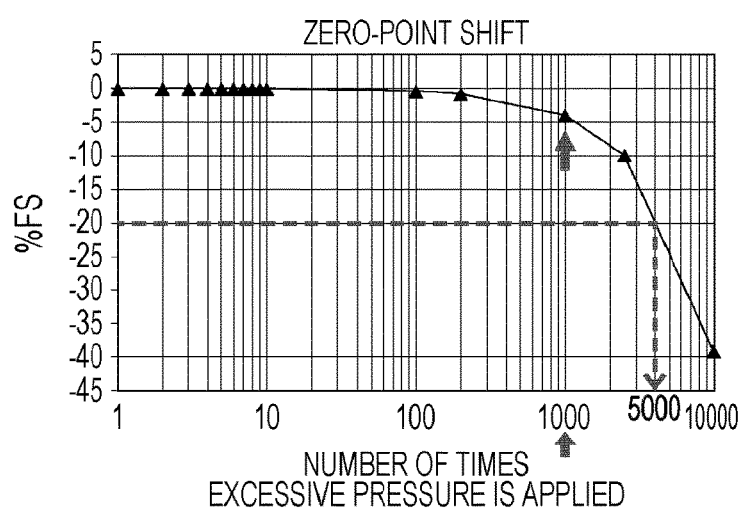
FIG. 2 is a characteristic diagram illustrating example changes in the number of times an excessive pressure that exceeds a measurable maximum pressure is applied and an amount of zero-point shift corresponding to the number of times an excessive pressure is applied.

FIG. 2 is a characteristic diagram illustrating example changes in the number of times an excessive pressure (atmospheric pressure, for example) that exceeds a measurable maximum pressure (degree of vacuum) is applied (horizontal axis) and an amount of zero-point shift corresponding to the number of times an excessive pressure is applied. If it is assumed that an amount of shift for which a zero-point adjustment is no longer possible is ±20% FS, for example, the number of times an excessive pressure is applied at which the amount of zero-point shift reaches ±20% FS (which is referred to as "threshold number of applications") is expected to be approximately 5000. The threshold number of applications is determined by taking into consideration, for example, the pressure range and the specifications of the vacuum gauge, variations produced during manufacture, and use conditions of the vacuum gauge. The upper limit of the number of applications is set to a number of applications sufficiently smaller than the threshold number of applications. An optimum value of the upper limit of the number of applications differs depending on the operation state of the apparatus of interest and a necessary period before maintenance, such as replacement of the vacuum gauge.

In a case where the measured number of times reaches the upper limit of the number of applications, an alarm is output through an interface operation panel or an output port of the vacuum gauge. In a case where the alarm is output through the output port, the alarm is displayed on an operation panel of a facility for manufacturing semiconductor devices, for example, in which the vacuum gauge is installed. The operator or administrator of the facility sees the display and immediately starts a procedure for maintenance to thereby prevent the apparatus from unexpectedly being stopped as much as possible.

Figure 3:
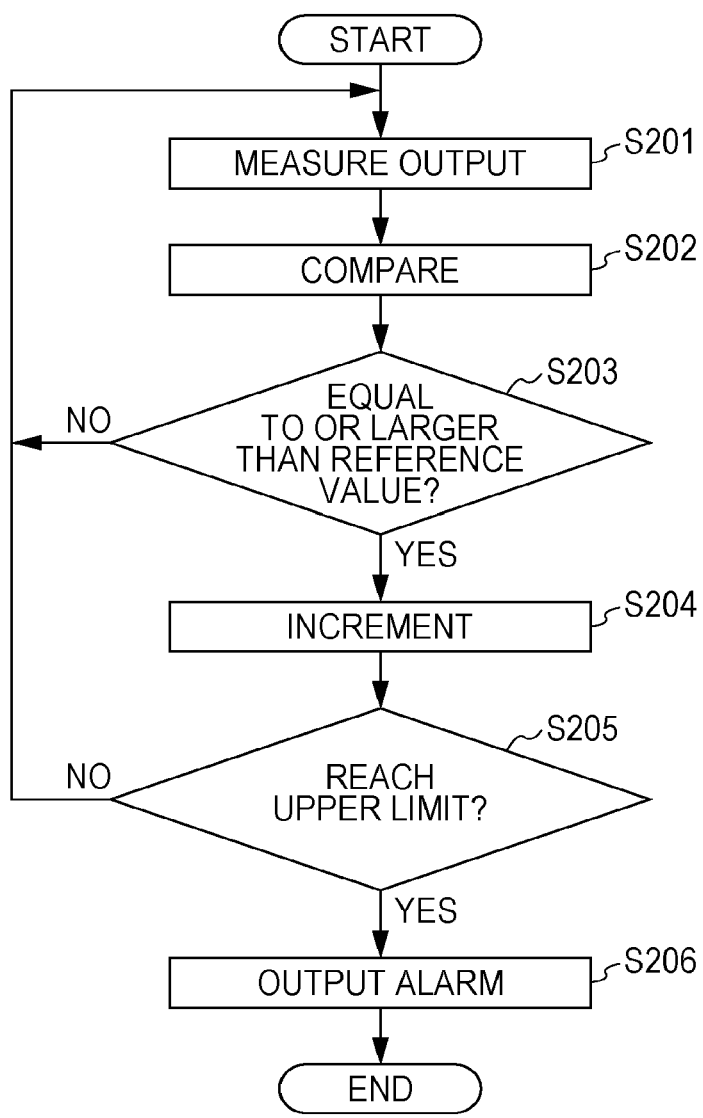
FIG. 3 is a flowchart for describing a vacuum gauge state detection method according to the first embodiment of the present invention.

Now, an operation (vacuum gauge state detection method) of the vacuum gauge state detection system according to the first embodiment of the present invention is described with reference to the flowchart in FIG. 3.

First, in step S201, the measuring unit 122 obtains an output value from the pressure value output unit 121. Next, in step S202, the state determination unit 123 compares the output value obtained in step S201 with the reference characteristic value, which serves as the reference.

Subsequently, in step S203, the state determination unit 123 determines whether the output value is equal to or larger than the reference characteristic value on the basis of the comparison in step S202. If it is determined that the output value is equal to or larger than the reference characteristic value (excessive pressure application state) (Yes in step S203), the state determination unit 123 increments the number of times the excessive pressure application state occurs by one in step S204. Subsequently, in step S205, the state determination unit 123 determines whether the number of times obtained in step S204 reaches the set upper limit. If it is determined that the obtained number of times reaches the set upper limit (Yes in step S205), the state determination unit 123 determines that it is now time to perform maintenance of the vacuum gauge (sensor chip 101) and causes the alarm output unit 125 to output an alarm in step S206. Accordingly, the operator or administrator of the facility can start a procedure for maintenance.

Second Embodiment

Now, a second embodiment of the present invention is described. A vacuum gauge state detection system according to the second embodiment includes the sensor chip 101, the pressure value output unit 121, the measuring unit 122, the state determination unit 123, the reference value storage unit 124, and the alarm output unit 125 as in the first embodiment described above (see FIG. 1).

In the second embodiment, the state determination unit 123 obtains time information about the time when the excessive pressure application state is determined to occur on the basis of the comparison between the output value obtained by the measuring unit 122 and the reference characteristic value, predicts the date and time when a zero-point adjustment for the vacuum gauge is no longer possible on the basis of the obtained time information, the number of times, and the set upper limit of the number of times, and determines the upper limit on the basis of a threshold date and time obtained by subtracting days and hours taken to perform maintenance of the vacuum gauge from the predicted date and time.

Figure 4:
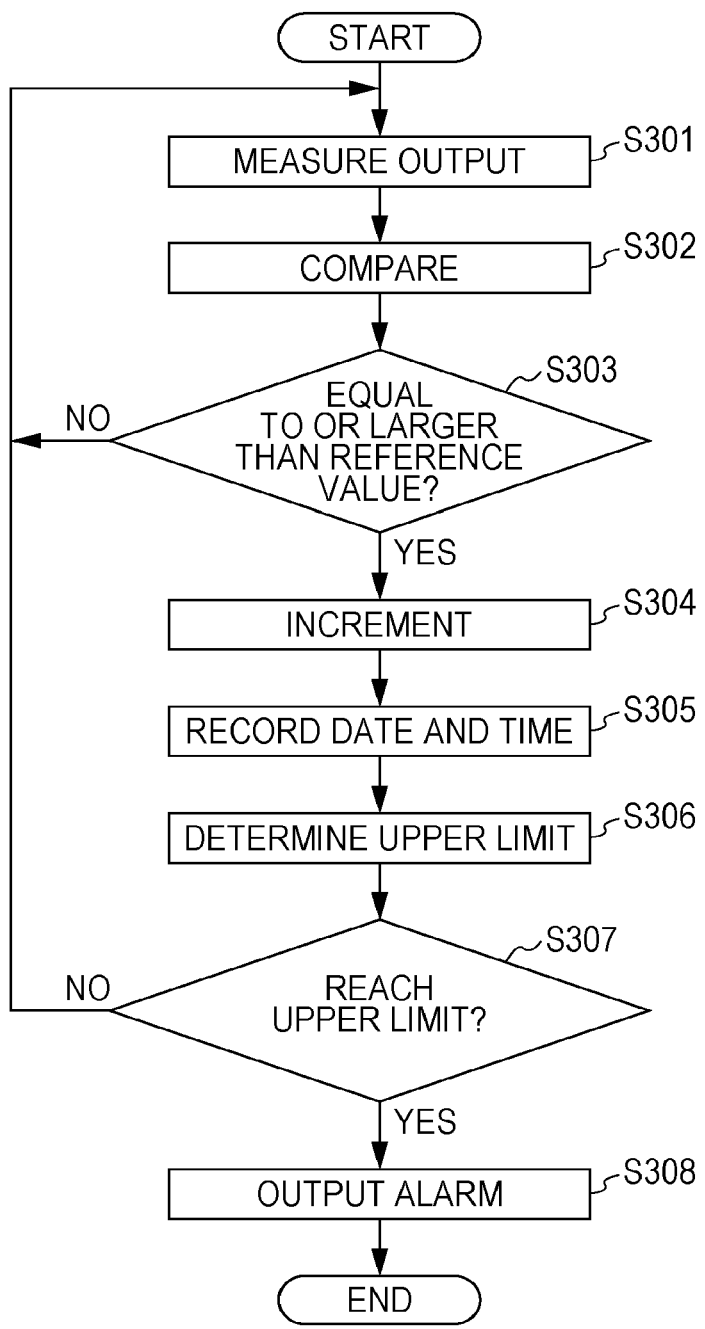
FIG. 4 is a flowchart for describing a vacuum gauge state detection method according to a second embodiment of the present invention.

Hereinafter, an operation (vacuum gauge state detection method) of the vacuum gauge state detection system according to the second embodiment is described with reference to the flowchart in FIG. 4.

First, in step S301, the measuring unit 122 obtains an output value from the pressure value output unit 121. Next, in step S302, the state determination unit 123 compares the output value obtained in step S301 with the reference characteristic value, which serves as the reference.

Subsequently, in step S303, the state determination unit 123 determines whether the output value is equal to or larger than the reference characteristic value on the basis of the comparison in step S302. If it is determined that the output value is equal to or larger than the reference characteristic value (excessive pressure application state) (Yes in step S303), the state determination unit 123 increments the number of times the excessive pressure application state occurs by one in step S304. Subsequently, in step S305, the state determination unit 123 obtains time information about the time when the output value based on which the excessive pressure application state is determined to occur is output.

Subsequently, in step S306, the state determination unit 123 predicts the date and time when a zero-point adjustment for the vacuum gauge is no longer possible on the basis of the obtained time information, the number of times obtained in step S304, and the set upper limit of the number of times, and determines the upper limit on the basis of a threshold date and time obtained by subtracting days and hours taken to perform maintenance of the vacuum gauge from the predicted date and time.

Subsequently, in step S307, the state determination unit 123 determines whether the number of times obtained in step S304 reaches the upper limit determined in step S306. If it is determined that the obtained number of times reaches the determined upper limit (Yes in step S307), the state determination unit 123 determines that it is now time to perform maintenance of the vacuum gauge (sensor chip 101) and causes the alarm output unit 125 to output an alarm in step S308. Accordingly, the operator or administrator of the facility can start a procedure for maintenance.

Third Embodiment

Now, a third embodiment of the present invention is described. A vacuum gauge state detection system according to the third embodiment includes the sensor chip 101, the pressure value output unit 121, the measuring unit 122, the state determination unit 123, the reference value storage unit 124, and the alarm output unit 125 as in the first embodiment described above (see FIG. 1).

In the third embodiment, the state determination unit 123 calculates a rate obtained by dividing an amount of adjustment made to the vacuum gauge in the last zero-point adjustment by the number of times the excessive pressure application state occurs, calculates a remaining number of times obtained by dividing an allowable amount of adjustment of the vacuum gauge at the current time point by the rate, and sets a value obtained by adding the remaining number of times to the number of times the excessive pressure application state occurs as the upper limit.

Figure 5:
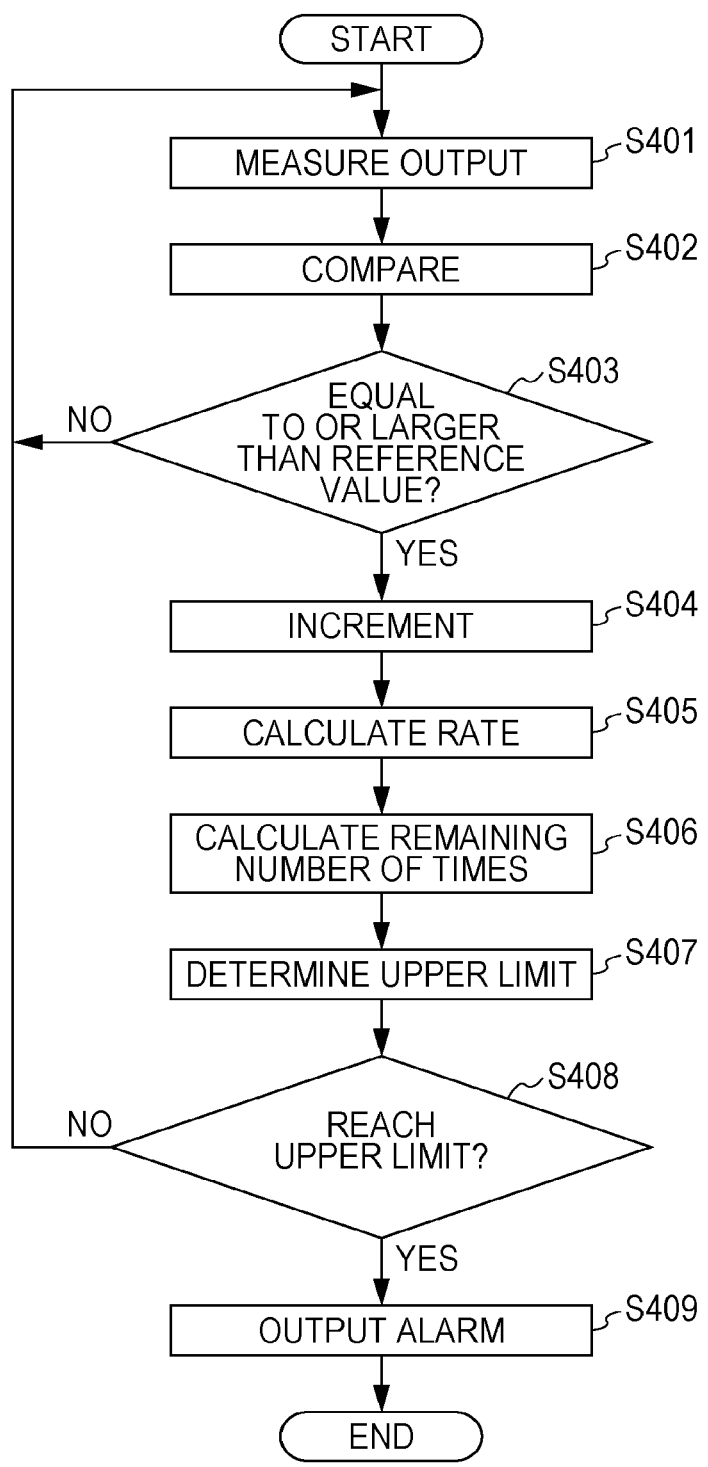
FIG. 5 is a flowchart for describing a vacuum gauge state detection method according to a third embodiment of the present invention.
Figure 6:
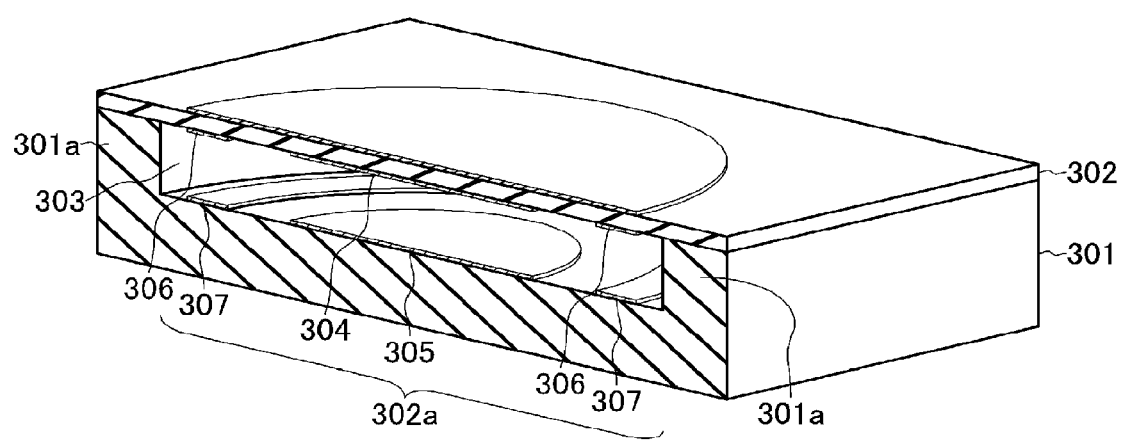
FIG. 6 is a perspective view illustrating a configuration of a capacitance diaphragm gauge.

Now, an operation (vacuum gauge state detection method) of the vacuum gauge state detection system according to the third embodiment is described with reference to the flowchart in FIG. 5.

First, in step S401, the measuring unit 122 obtains an output value from the pressure value output unit 121. Next, in step S402, the state determination unit 123 compares the output value obtained in step S401 with the reference characteristic value, which serves as the reference.

Subsequently, in step S403, the state determination unit 123 determines whether the output value is equal to or larger than the reference characteristic value on the basis of the comparison in step S402. If it is determined that the output value is equal to or larger than the reference characteristic value (excessive pressure application state) (Yes in step S403), the state determination unit 123 increments the number of times the excessive pressure application state occurs by one in step S404. Subsequently, in step S405, the state determination unit 123 calculates a rate obtained by dividing an amount of adjustment made to the vacuum gauge in the last zero-point adjustment by the number of times the excessive pressure application state occurs.

Subsequently, in step S406, the state determination unit 123 calculates a remaining number of times obtained by dividing an allowable amount of adjustment of the vacuum gauge at the current time point by the rate. Subsequently, in step S407, the state determination unit 123 sets a value obtained by adding the calculated remaining number of times to the number of times the excessive pressure application state occurs obtained in step S404 as the upper limit.

Subsequently, in step S408, the state determination unit 123 determines whether the number of times obtained in step S404 reaches the upper limit set in step S407. If it is determined that the obtained number of times reaches the set upper limit (Yes in step S408), the state determination unit 123 determines that it is now time to perform maintenance of the vacuum gauge (sensor chip 101) and causes the alarm output unit 125 to output an alarm in step S409. Accordingly, the operator or administrator of the facility can start a procedure for maintenance.

As described above, according to the embodiments of the present invention, it is determined that it is now time to perform maintenance of the vacuum gauge when the number of times the excessive pressure application state in which the output value of the vacuum gauge is equal to or larger than the reference characteristic value occurs reaches the upper limit. Therefore, the time when maintenance of the vacuum gauge is to be performed can be more precisely determined.

Note that embodiments of the present invention are not limited to those described above, and it is obvious that various modifications and combinations can be made by a person having ordinary knowledge in the art without departing from the technical spirit of the present invention. For example, the reference electrodes are used in the above-described configuration; however, the configuration is not restrictive, and the fixed electrode and the fixed reference electrode may be integrated together, and the movable electrode and the movable reference electrode may be integrated together.

What is claimed is:

1. A vacuum gauge state detection method for determining when to perform a zero-point adjustment, by detecting a state of a diaphragm of a vacuum gauge, the vacuum gauge being constituted by a sensor chip including the diaphragm that is displaceable and that senses pressure from a measurement target, the sensor chip detecting a deflection of the diaphragm as a capacitance change, the method comprising:
- obtaining an output value of the vacuum gauge;
- comparing the obtained output value with a reference characteristic value that serves as a reference to determine that an excessive pressure application state occurs in which the sensor chip senses pressure exceeding a predetermined level of pressure;
- counting a number of times the excessive pressure application state occurs in which the obtained output value of the vacuum gauge is determined to be equal to or larger than the reference characteristic value;
- determining whether the counted number of times reaches an upper limit; and
- when determining that the counted number of times reaches the upper limit, outputting an alarm indicating that the zero-point adjustment needs to be performed.

2. The vacuum gauge state detection method according to claim 1, further comprising:
- obtaining a rate by dividing an amount of adjustment made to the vacuum gauge in a last zero-point adjustment by the counted number of times;
- determining a remaining number of times based on a value obtained by dividing an allowable amount of adjustment of the vacuum gauge at a current time point by the obtained rate; and
- setting, as the upper limit, a value obtained by adding the determined remaining number of times to the counted number of times.

3. The vacuum gauge state detection method according to claim 1, further comprising:
- obtaining an excessive-pressure time point indicating when the excessive pressure application state is determined to have occurred; and
- predicting a time point when the zero-point adjustment for the vacuum gauge is no longer possible based on the obtained excessive-pressure time point, the counted number of times, and the upper limit.

4. The vacuum gauge state detection method of claim 3, further comprising:
- calculating a threshold time point by subtracting a maintenance time interval from the predicted time point, the maintenance time interval being a length of time needed to perform maintenance of the vacuum gauge; and
- determining a value of the upper limit based on the calculated threshold time point.

5. A vacuum gauge state detection system for determining when to perform a zero-point adjustment, comprising:
- a vacuum gauge including a sensor chip including a diaphragm that is displaceable and that senses pressure from a measurement target, the sensor chip detecting a deflection of the diaphragm as a capacitance change; and
- processing circuitry configured to
  - obtain an output value of the vacuum gauge,
  - compare the obtained output value with a reference characteristic value that serves as a reference to determine that an excessive pressure application state occurs in which the sensor chip senses pressure exceeding a predetermined level of pressure,
  - count a number of times the excessive pressure application state occurs in which the obtained output value of the vacuum gauge is determined to be equal to or larger than the reference characteristic value,
  - determine whether the counted number of times reaches an upper limit; and
  - when determining that the counted number of times reaches the upper limit, output an alarm indicating that the zero-point adjustment needs to be performed.

6. The vacuum gauge state detection system according to claim 5, wherein the processing circuitry is further configured to
- obtain a rate by dividing an amount of adjustment made to the vacuum gauge in a last zero-point adjustment by the counted number of times,
- determine a remaining number of times based on a value obtained by dividing an allowable amount of adjustment of the vacuum gauge at a current time point by the obtained rate, and
- set, as the upper limit, a value obtained by adding the determined remaining number of times to the counted number of times.

7. The vacuum gauge state detection system according to claim 5, wherein the processing circuitry is further configured to
- obtain an excessive-pressure time point indicating when the excessive pressure application state is determined to have occurred, and
- predict a time point when the zero-point adjustment for the vacuum gauge is no longer possible based on the obtained excessive-pressure time point, the counted number of times, and the upper limit.

8. The vacuum gauge state detection method of claim 7, wherein the processing circuitry is further configured to:
- calculate a threshold time point by subtracting a maintenance time interval from the predicted time point, the maintenance time interval being a length of time needed to perform maintenance of the vacuum gauge; and
- determine a value of the upper limit based on the calculated threshold time point.

\* \* \* \* \*